US006966941B1

(12) United States Patent
Grobler et al.

(10) Patent No.: US 6,966,941 B1
(45) Date of Patent: Nov. 22, 2005

(54) SEWAGE SLUDGE TREATMENT

(75) Inventors: Marius Grobler, Payson, AZ (US); John A. Bewsey, Sandton (ZA); Oliver O. Hart, Pretoria (ZA)

(73) Assignee: BER Systems, Inc., Scottsdale, AZ (US)

( * ) Notice: Subject to any disclaimer, the term of this patent is extended or adjusted under 35 U.S.C. 154(b) by 333 days.

(21) Appl. No.: 10/291,892

(22) Filed: Nov. 11, 2002

Related U.S. Application Data

(63) Continuation-in-part of application No. 08/926,109, filed on Sep. 9, 1997, now abandoned.

(51) Int. Cl.[7] ............................ C01F 7/00; C02F 11/00
(52) U.S. Cl. ....................... 71/11; 71/12; 71/13; 71/14; 210/609; 210/613; 210/764; 210/770
(58) Field of Search ...................... 71/11–14; 210/764, 210/609, 613, 770, 606

(56) References Cited

U.S. PATENT DOCUMENTS

| | | | |
|---|---|---|---|
| 3,942,970 | A | 3/1976 | O'Donnell |
| 4,038,180 | A | 7/1977 | Talbert |
| 4,701,126 | A | 10/1987 | Gray et al. |
| 4,708,159 | A | 11/1987 | Lockwood, Jr. |
| 4,743,287 | A | 5/1988 | Robinson |
| 4,819,873 | A | 4/1989 | Lockwood, Jr. |
| 4,838,784 | A | 6/1989 | Lockwood, Jr. |
| 4,872,998 | A | 10/1989 | Dausman et al. |
| 4,941,820 | A | 7/1990 | Lockwood, Jr. |
| 4,992,039 | A | 2/1991 | Lockwood, Jr. |
| 5,069,801 | A | 12/1991 | Girovich |
| 5,125,951 | A | 6/1992 | Lahoda et al. |
| 5,275,733 | A | 1/1994 | Burnham |
| 5,393,317 | A | 2/1995 | Robinson |
| 5,401,291 | A | 3/1995 | Inoue |
| 5,443,613 | A | 8/1995 | Robinson |
| 5,635,069 | A | 6/1997 | Boss |
| 5,810,475 | A * | 9/1998 | St. Ama ..................... 366/192 |

OTHER PUBLICATIONS

T.O.M. Holdings Ltd. "Active Sludge Pasteurization" brochure, undated.
Atritor Limited "Attrition Drying—Turning Waste Into Profit" brochure, undated.
Rosin Engineering Company Limited "Rosin ring driers" brochure, undated.
Bepex Corporation "Unison—The Latest Wave In Drying Systems" brochure, undated.
NEA Technology Transfer Corporation "Technology Description—Pulse Combustor and Rotary Valve", information sheet, undated.

* cited by examiner

*Primary Examiner*—Stanley S. Silverman
*Assistant Examiner*—Maribel Medina
(74) *Attorney, Agent, or Firm*—Thomte, Mazour & Niebergall; Dennis L. Thomte

(57) ABSTRACT

An apparatus and method for treating organic waste sludge such as sewage sludge is disclosed wherein the sludge is first dewatered, moved to a day hopper for storage, and then successively passed through first and second reactors. As the sludge is passed through the first reactor, in a continuous fashion, the sludge and acid are thoroughly mixed and has the pH thereof substantially lowered due to the addition of acid in the first reactor. The sludge is then moved through the second reactor where the sludge is subjected to a base material to substantially raise the pH thereof. The treated sludge is then pumped from the second reactor to a pugmill and then to a dryer which dries the material. The dried material is then suitable for use as a fertilizer.

16 Claims, 7 Drawing Sheets

SEWAGE SLUDGE TREATMENT

CROSS-REFERENCE TO RELATED APPLICATION

This is a continuation-in-part application of Petitioners' earlier application Ser. No. 08/926,109 filed Sep. 9, 1997, entitled SEWAGE SLUDGE TREATMENT, now abandoned.

BACKGROUND OF THE INVENTION

1. Field of the Invention

This invention relates to an apparatus and method for treating organic waste sludge and, more particularly, to an apparatus and method for treating sewage sludge.

2. Description of the Related Art

The efficient and commercially effective utilization of organic waste sludge such as sewage sludge is important for society, particularly with the increase of population and demands which are made on land. At present, sewage sludge is dried in large bed pans, and the dried product is used as a compost high in organics. Although such composts are useful in enhancing the retention and storage of water in soil, the composts are low in inorganics and, hence, have limited fertilizer properties. The drying process is environmentally undesirable in that offensive odors are produced. Further, the prior art methods of drying the sludges are capital-intensive.

Processes have been suggested for treating sewage sludge to sterilize and disinfect the same. For example, South African Patent No. 89/6160 discloses such a method which involves treating sewage sludge with anhydrous ammonia gas to increase the pH of the sludge to at least 10, followed by using sufficient inorganic acid to neutralize, or substantially neutralize, the sewage sludge/ammonia admixture. The resulting product is a liquid which is said to be useful as a fertilizer. It is further suggested that the liquid can be dried, e.g., by evaporation.

A prior art process for treating organic material such as sewage sludge for use as a fertilizer is disclosed in U.S. Pat. No. 5,393,317, and it is believed that the process described in the '317 patent is less than desirable due to the time required for treating the same inasmuch as in certain steps thereof, the mixture is allowed to stand for at least 20 minutes. Another prior art process for treating organic material such as sewage sludge is disclosed in U.S. Pat. No. 4,743,287. It is also believed that the '287 process is less than desirable, since water must be added to the mixture of organic material and major elements to produce a moisture content of 12%–30% by weight. Still another process is disclosed in U.S. Pat. No. 5,443,613. It is also believed that the process of the '613 patent is less than desirable, since water must be added to an acidified suspension. It is believed that those processes requiring an addition of water to the product increase the amount of drying required and, hence, causes an increase in drying time.

SUMMARY OF THE INVENTION

According to the present invention, an apparatus and method is disclosed for treating organic waste sludge such as sewage sludge with the sewage sludge being able to be used as a fertilizer. The sewage sludge which is treated by the method of this invention may be raw sewage sludge, activated sewage sludge, or aerobically or anaerobically digested sludge. The sewage sludge is first dewatered by a mechanical dewatering apparatus of conventional design.

The sewage sludge is mechanically dewatered so that the sewage sludge is comprised of a predetermined percentage of dry solids. The dewatered sewage sludge is then moved into a day hopper for storage until the sewage sludge is to be processed. The day hopper has a live bottom therein so that the material therein may be constantly circulated or agitated to prevent the same from coagulating or caking at the bottom thereof. The dewatered sewage sludge or sludge cake is then delivered to a reactor pump which passes the sludge cake to a first non-pressurized acid reactor or mixer wherein the sludge cake is mixed with and treated with an acid to substantially lower the pH thereof. As the sludge cake is passed through the first acid reactor, in a continuous fashion, the sludge cake is subjected to a thorough mixing action. The sludge cake is then passed, in a continuous fashion, from the first acid reactor by a screw conveyor or the like to a second reactor wherein the sludge cake is mixed with and subjected to a base material to substantially raise the pH thereof. The treated sludge cake is then pumped from the second reactor to a pugmill and then to a dryer such as a rotary dryer or pulse combustion dryer.

The dried product from the dryer is supplied to a cyclone separator, with the finished product resembling a fine powder or granular material depending on the dryer being utilized. The treatment of the sludge cake with an acid, then a base, and then drying the same results in a bacteria-free, pathogen-free product which has very little, if any, offensive odor, with the finished product being suitable for use as a fertilizer.

The invention disclosed in the co-pending application has been proven to work at a site in Payson, Ariz. In the apparatus of the co-pending application, the acid reactor is a closed, pressurized reactor. It has been discovered that the pressures in the acid reactor may result in leaks around the bearing areas. Further, since the acid reactor in the co-pending application is closed, it is impossible to observe the mixing action within the acid reactor or mixer. In some cases, it has been found that the mixing action in the acid reactor of the co-pending application is not as thorough as is desired. The instant application provides at least a pair of elongated rotatable shafts having mixing paddles mounted thereon which extend transversely from the shafts and which are either right-hand or left-hand paddles which ensure that the acid is properly mixed with the dewatered sludge passing through the acid reactor.

It is therefore a principal object of the invention to provide an improved apparatus and process for treating sewage sludge.

Still another object of the invention is to provide a process for treating sewage sludge wherein the final product is substantially bacteria-free, pathogen-free and which may be used as a fertilizer.

Still another object of the invention is to provide a continuous process, as opposed to a batch process, for treating sewage sludge.

Yet another object of the invention is to provide an improved acid reactor or mixer which thoroughly mixes acid with the dewatered sludge.

Still another object of the invention is to provide a non-pressurized acid reactor or mixer having improved mixing capability.

Still another object of the invention is to provide a process for treating sewage sludge wherein the sewage sludge is converted from sludge cake to a finished product in a short period of time.

Still another object of the invention is to provide a process for treating sewage sludge which substantially reduces, if not eliminates, offensive odors normally associated with sewage sludge processing.

Still another object of the invention is to provide a process for treating sewage sludge which can be computer-controlled.

These and other objects will be apparent to those skilled in the art.

DESCRIPTION OF THE PREFERRED EMBODIMENT

Figure 1:
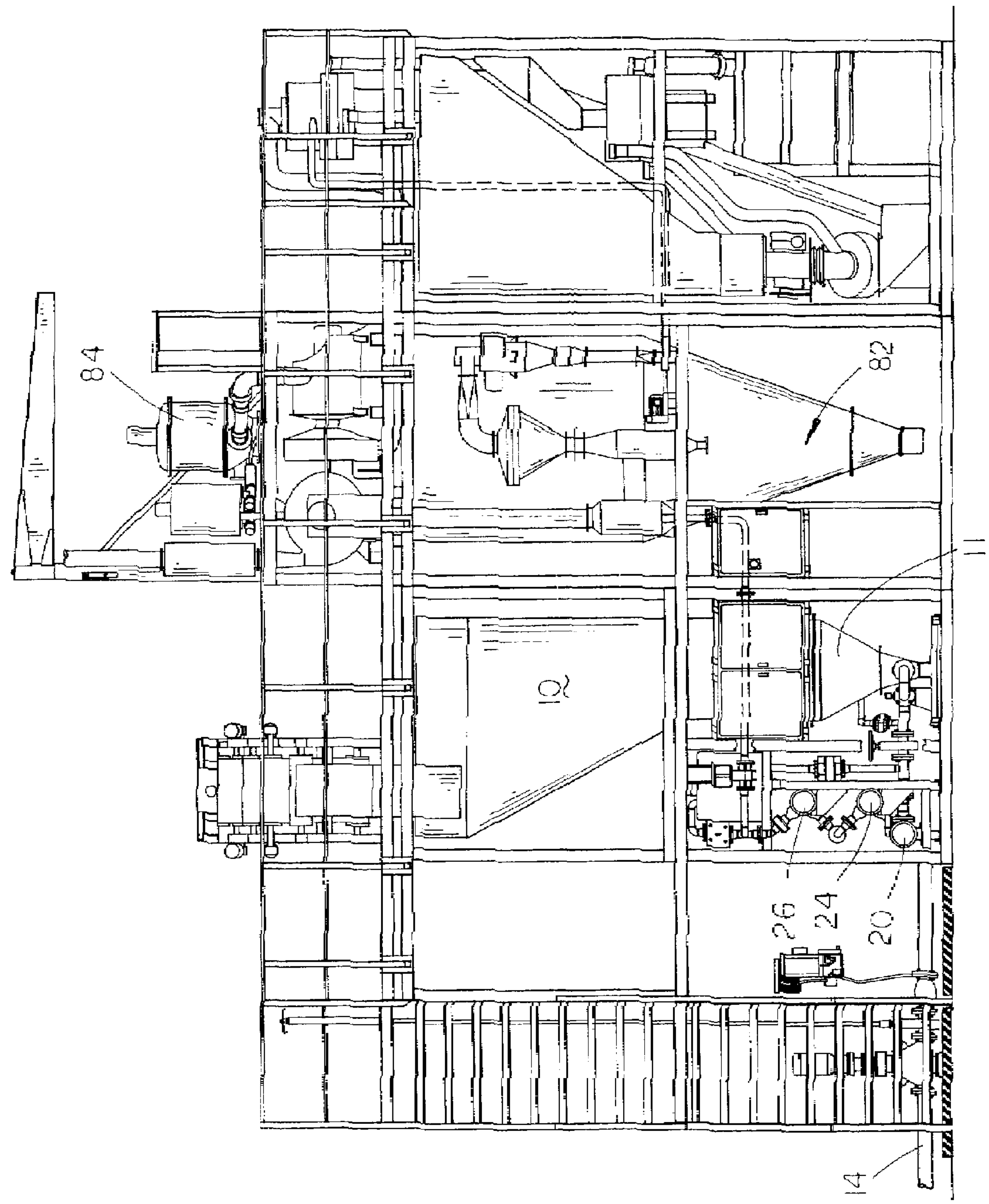
FIG. 1 is a side view of the apparatus of this invention.
Figure 2:
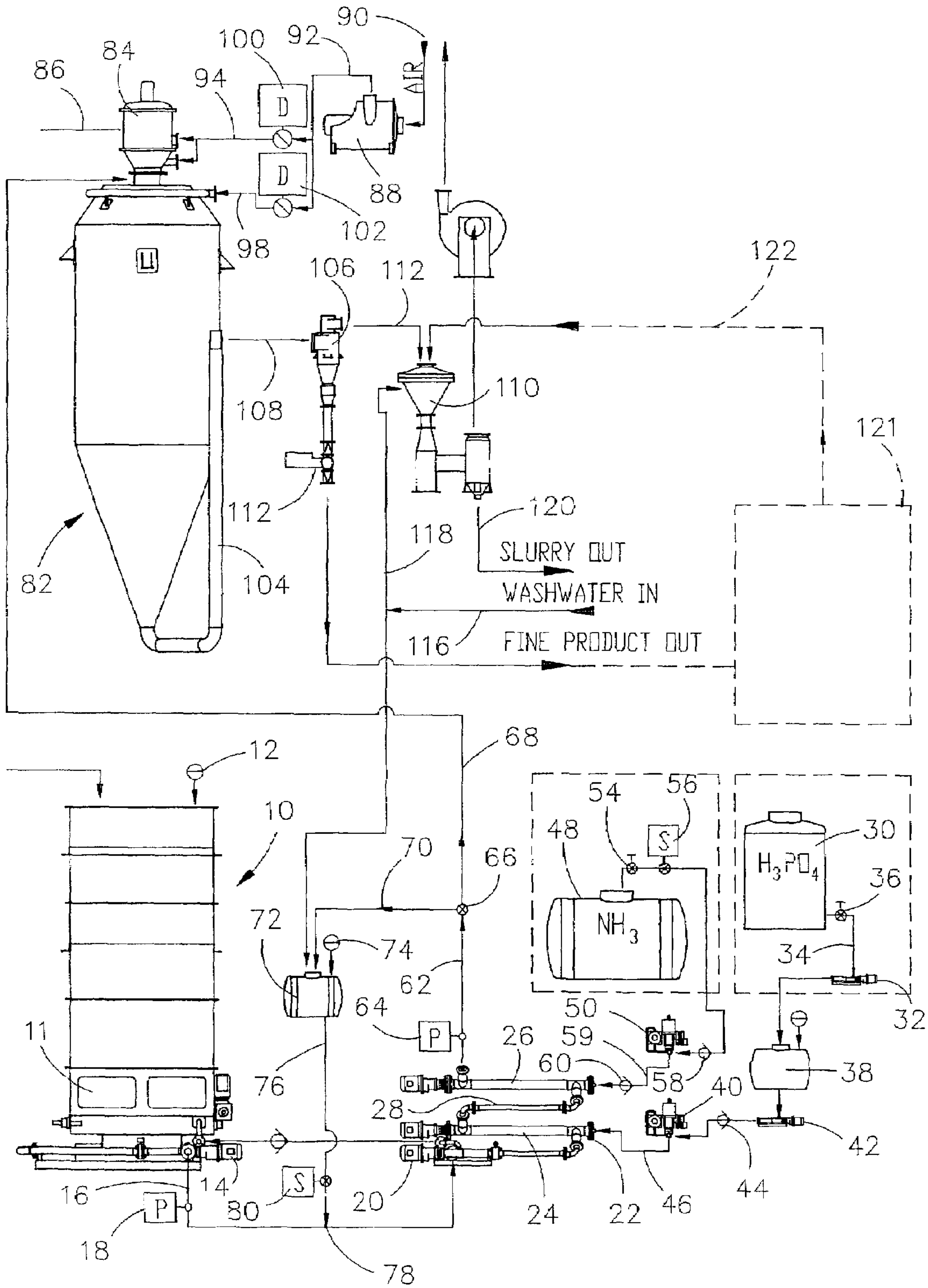
FIG. 2 is a schematic of the apparatus and process.
Figure 3:
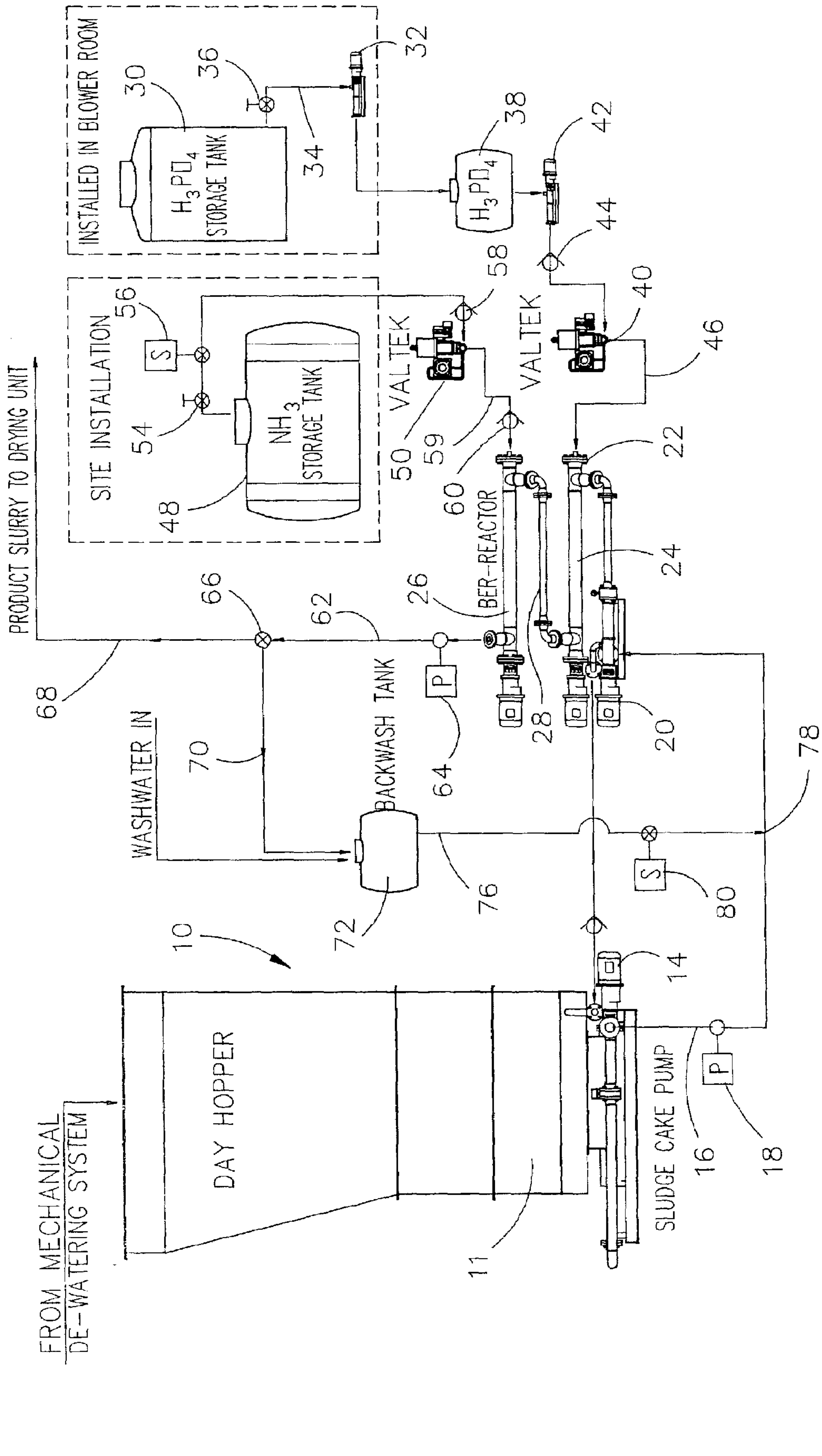
FIG. 3 is an enlarged schematic of a portion of FIG. 2.
Figure 4:
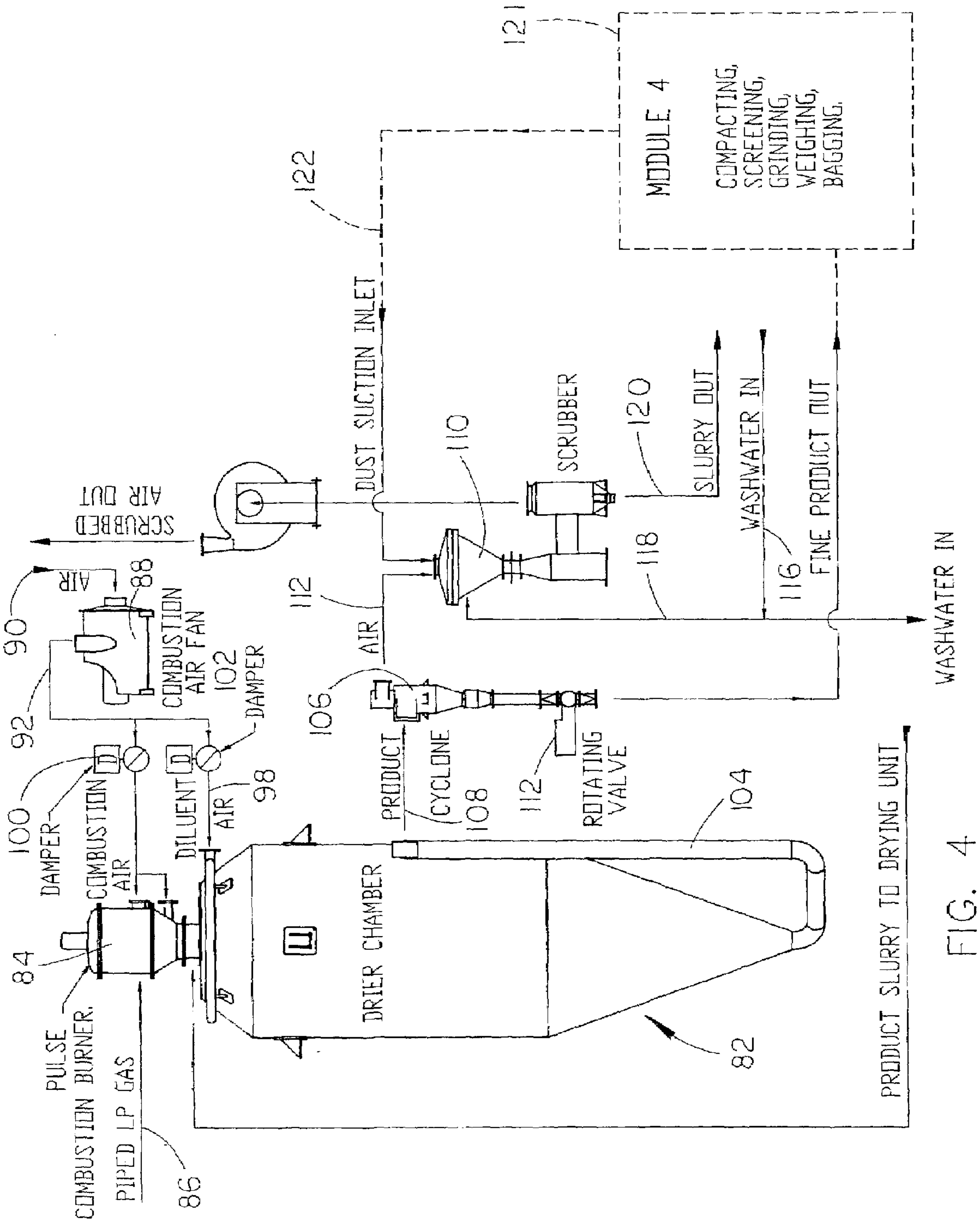
FIG. 4 is an enlarged schematic of a portion of FIG. 2.

One apparatus which is used to practice the process of this invention is illustrated in the drawings in FIGS. 1–4 while FIGS. 5–9 illustrated an improved acid reactor and associated structure. Although the drawings illustrate the preferred embodiment of the apparatus which is used for practicing the preferred embodiment, certain changes may be made therein without departing from the spirit of the invention.

Referring to FIGS. 1–4, the sewage sludge which is treated by the method of this invention may be raw sewage sludge, activated sewage sludge, or aerobically or anaerobically digested sludge. The sewage sludge is mechanically dewatered through the use of a belt-press dewatering apparatus of conventional design. Preferably, the sewage sludge is dewatered to a solid content of 18%–22%, with a 20% solid content being preferred. The dewatered sewage sludge is commonly referred to as sludge cake, with the consistency of the same typically being coherent and non-flowable and, due to the moisture content, it will be wet.

The dewatered sewage sludge is delivered to the upper end of a day hopper 10 which has a conventional live bottom apparatus 11 at its lower end to circulate the materials in the day hopper to prevent the coagulation or caking of the same. Preferably, day hopper 10 includes a level sensor 12 which will control the delivery of the sludge cake thereto. The numeral 14 refers to a sludge cake pump which is in communication with the lower end of the day hopper 10 and which has a discharge line conduit 16 extending therefrom which includes a pressure sensor 18. Discharge line 16 is in fluid communication with a reactor pump 20 which pumps the sludge cake to the inlet 22 of a reactor 24. Reactor 24 includes a high shear paddle mixer assembly therein to subject the sludge cake to a desirable high shear mixing action. The discharge end of reactor 24 is connected to the intake end of a second reactor 26 by means of pipe 28. Reactor 26 also includes a high shear paddle mixer assembly therein to subject the sludge cake to the desired high shear mixing action.

The intake end of reactor 24 is operatively connected to a source of inorganic acid material such as phosphoric acid, sulphuric acid or nitric acid. The nature of the acid will be selected according to the nature of the inorganic component desired in the final product. Acid storage tank 30 is connected to a supply pump 32 by line 34 having a stop valve 36 therein. Supply pump 32 is preferably connected to smaller acid tank 38 which in turn is connected to an electronic valve assembly 40 through pump 42 and check valve 44. Valve 40 is connected to the intake end of the first reactor 24 by means of line 46.

The numeral 48 refers to a storage tank for the base material such as ammonia, ammonium hydroxide, potassium hydroxide, sodium carbonate, sodium hydroxide, lime or magnesite. The preferred base is ammonia gas, preferably anhydrous ammonia gas. Tank 48 is connected to electrically operated valve assembly 50 by means of line 52 having stop valves 54 and 56 imposed therein. As seen in the drawings, line 52 also has a check valve 58 imposed therein. Valve assembly 50 is connected to the intake end of reactor 26 by means of line 59 having check valve 60 therein.

Line 62 extends from the discharge end of reactor 26 and includes a pressure sensor 64 therein. Line 62 extends to a three-port, two-way valve 66 having lines 68 and 70 extending therefrom. Line 70 extends to a backwash tank 72 including a level sensor 74. Line 76 extends from backwash tank 72 to line 16, where it is connected thereto at 78. Stop valve 80 is preferably imposed in line 76, as indicated.

Line 68 extends to a dryer assembly referred to generally by the reference numeral 82, which is preferably of the pulse combustion type although a rotary dryer will also work in a satisfactory manner. Pulse combustion dryers are described in U.S. Pat. Nos. 4,708,159; 4,819,873; 4,838,784; 4,941,820; and 4,992,039. The pulse combustion dryer utilized in this invention utilizes high sound levels to enhance the drying process. In the pulse combustion dryer of this invention, the treated sludge cake is subjected to a high temperature pulsing high sound level airstream which atomizes the material. It is believed that pulse combustion drying enhances the sterilization of the product due to the fact that any pathogens remaining in the product will be atomized and destroyed.

The sludge cake preferably passes through the pulse combustion dryer in approximately fifteen to twenty seconds with the temperature therein being approximately 235°–265° F. Dryer 82 includes a pulse combustion burner 84 having a supply of fuel being delivered thereto by means of line 86. Combustion air is supplied to the pulse combustion burner 84 by means of the combustion air fan 88 which is in communication with a source of air 90. Combustion air fan 88 has a conduit or the like 92 extending therefrom which delivers combustion air to the pulse combustion burner 84 by means of conduit 94 and which delivers diluent air to the upper end of the dryer chamber 96 by means of the conduit 98. Conduits 94 and 98 are provided with dampers 100 and 102, respectively.

The dried product is discharged from the dryer chamber 96 by means of the discharge conduit 104 and is preferably supplied to a cyclone separator 106 by means of conduit 108. Air from the separator 106 is delivered to a scrubber assembly 110 by means of air line 112. The finished product is collected at the lower end of the cyclone separator which is preferably provided with a rotating valve 112. Washwater is provided to the scrubber 110 by means of washwater line 116 being in communication with line 118. Line 118 is also in communication with the backwash tank 72, as indicated.

The numeral 120 refers to a slurry line which extends from the lower end of the scrubber assembly 110.

Preferably, the finished product is taken from the cyclone separator 106 and is delivered to a module referred to generally by the reference numeral 121, where the finished product is compacted, screened, ground, weighed, etc. If desired, the module 121 may be connected to the dust suction inlet of the scrubber 110 by means of conduit 122.

When it is desired to process or treat the sludge cake in the day hopper 10, the pumps 14, 20, 32 and 42 are activated. At the same time, the pulse combustion dryer assembly is activated, as will be the cyclone separator, scrubber, etc. Initially, as the dryer is heating to its desired temperature, the sludge cake will be passed through the reactors 24 and 26 and will be recirculated through the backwash tank by means of lines 62, 70 and the line 76. After the dryer has sufficiently heated, line 70 will normally not be utilized. As previously stated, the sludge cake is subjected to high shear agitation or mixing in reactor 24 and in reactor 26. The acid is mixed with the sludge cake in reactor 24 so that the pH of the sludge cake is substantially lowered to approximately 0.5 to 1.5, with the preferred pH being approximately 1.0. As the treated sludge cake subsequently passes through the reactor 26, sufficient base material is mixed therewith to substantially raise the pH thereof. The pH of the sludge cake is preferably raised to approximately 4.3 to 5.5 in the second reactor 26, with the preferred pH being 4.5. The reaction of the base material with the sludge cake in reactor 26 will cause the temperature of the same to be raised to approximately 85°–95° C. Preferably, it should take approximately 1.5 minutes for the sludge cake to pass through reactor 24 and will take approximately 1.5 minutes to pass through reactor 26. The retention time in the reactors will depend upon the volume of material being treated and the particular acids and bases being used.

As stated, the inorganic acid will typically be phosphoric acid, sulphuric acid or nitric acid. The nature of the acid will be selected according to the nature of the inorganic component desired in the final product. The amount of inorganic acid used will also depend on the quantity of inorganic components required in the powdered or granular final product. Heat is generated from the contact between the acid and the sludge cake, although further heat may be added if required. Heat has the effect of killing the pathogens in the sludge cake. Acid treatment has the effect of hydrolyzing organic material in the sludge and reducing the viscosity of the sludge cake, making it flowable. As also stated, the base which is used and the concentration thereof will be determined by the inorganic component required in the final product.

A very important part of the invention of FIGS. 1–4 is the use of the pulse combustion dryer. In such a dryer, sound pressures and heat are generated in a combustion chamber and are used to dry the product. The sound pressures and heat are generally passed into the drying chamber and the treated sludge is then introduced into the path of the sound pressures and heat in the drying chamber. Sound pressures as high as 180 dBA and combustion temperatures in the amount of 235°–265° F. are produced in the dryer. The sound pressures disperse the sludge or slurry into droplets which are dried by the heated air. A fine powder is produced, as previously described. When fine powders are not desired, a conventional rotary dryer is the preferred drying apparatus.

Figure 5:
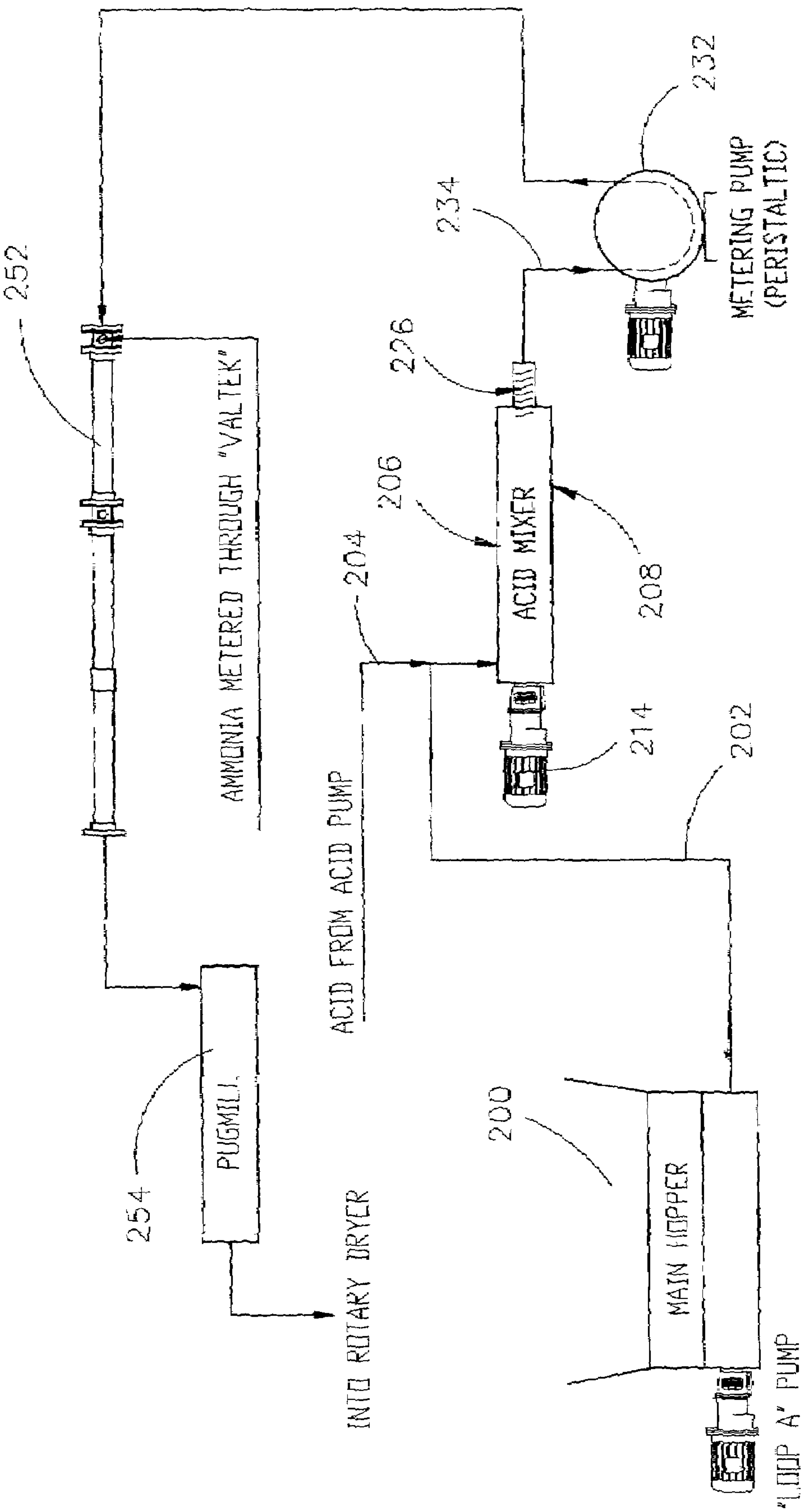
FIG. 5 is a partial schematic of the apparatus of this invention.

FIGS. 5–9 illustrate the improved acid reactor and related mechanisms or structures of this invention which ensure that the dewatered sludge will be properly mixed with the acid while passing through the acid reactor. As seen in FIG. 5, the dewatered sludge is transferred from the main hopper 200, through line 202 to line 204 which is in communication with the acid being discharged from an acid pump.

Figure 7:
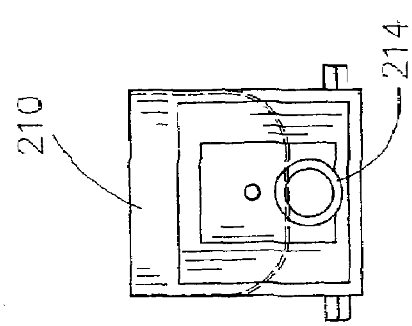
FIG. 7 is a partial end view of the mixer of FIG. 6.
Figure 9:
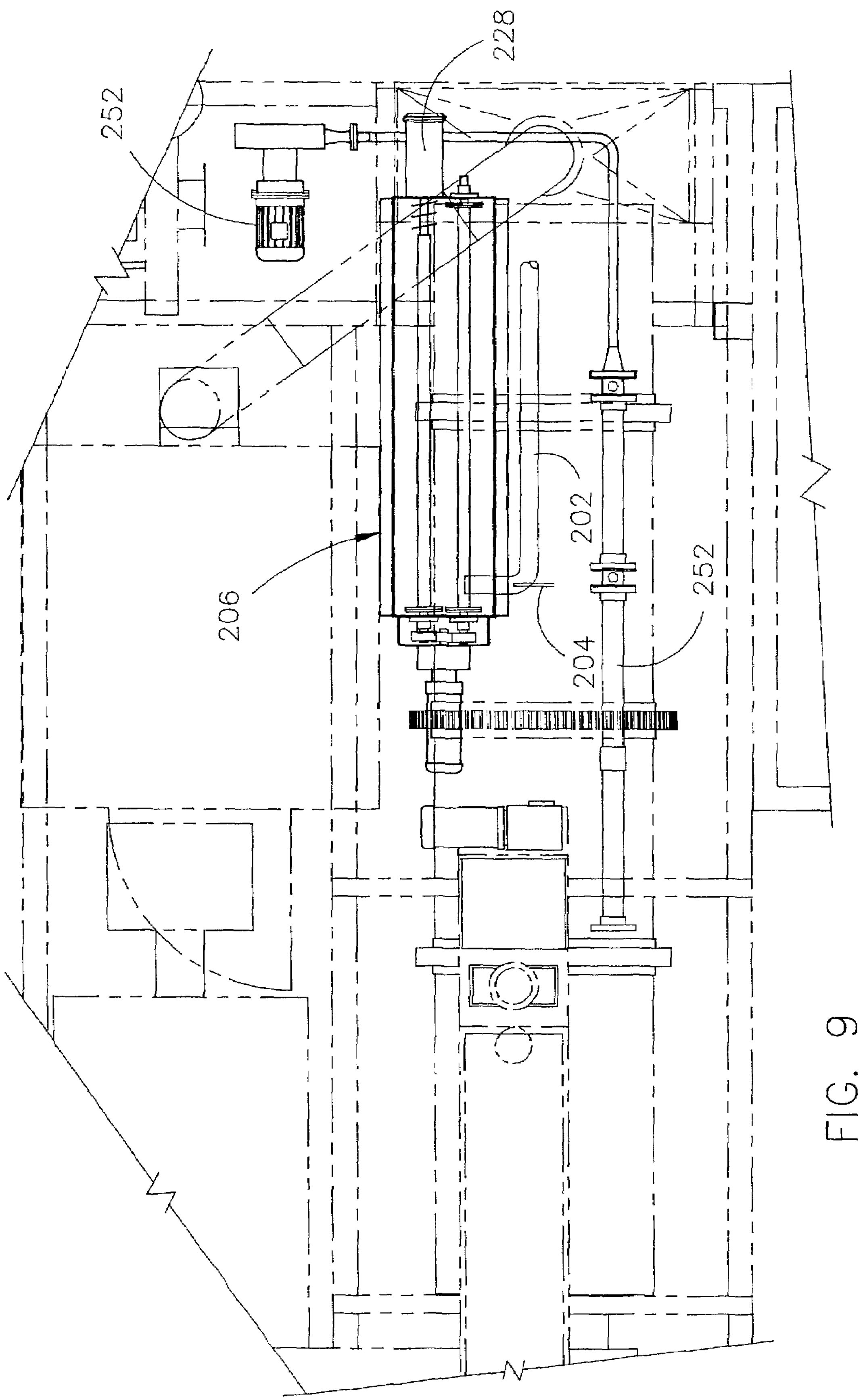
FIG. 9 is a top view of the mixer of FIG. 6 depicting its relationship with other components of the apparatus of this invention.

The improved acid mixer or reactor of this invention is designated by the reference numeral 206. Acid reactor 206 is comprised of an elongated body or housing 208 having opposite ends 210 and 212. Body 208 is a non-pressurized body having an open upper end 209 which is selectively covered with an anti-splash cover. An electric gear motor 214 or the like is mounted on end 210 of body 208 and has a rotatable drive shaft 216 extending therefrom which drives gears 218 and 220 which drive square shafts 222 and 224 in the same direction, respectively. Shafts 222 and 224 are suitably rotatably mounted in body 208 (FIG. 7). Although a pair of shafts 222 and 224 are illustrated, two or more shafts may be utilized in the acid reactor 206. One end of shaft 222 preferably has a screw conveyor 226 mounted thereon which extends from end 212 through a tube 228 having a discharge pipe 230 extending therefore. Pipe 230 is suitably connected to the intake side of a peristaltic metering pump 232 by a pipe or conduit 234.

Figure 6:
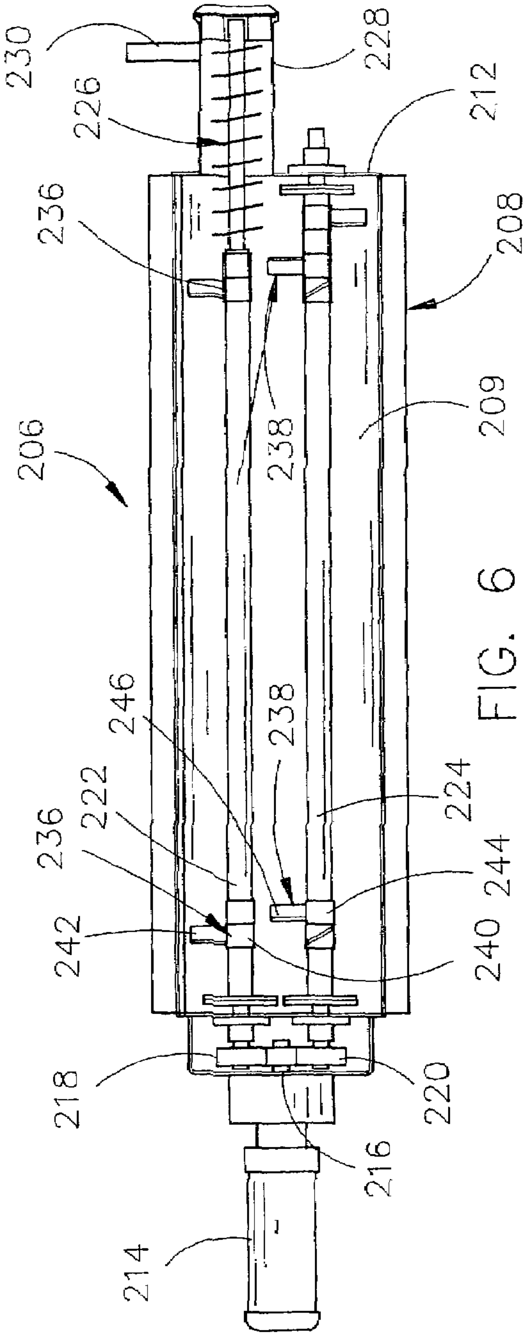
FIG. 6 is a top view of the improved acid reactor or mixer of this invention.
Figure 8:
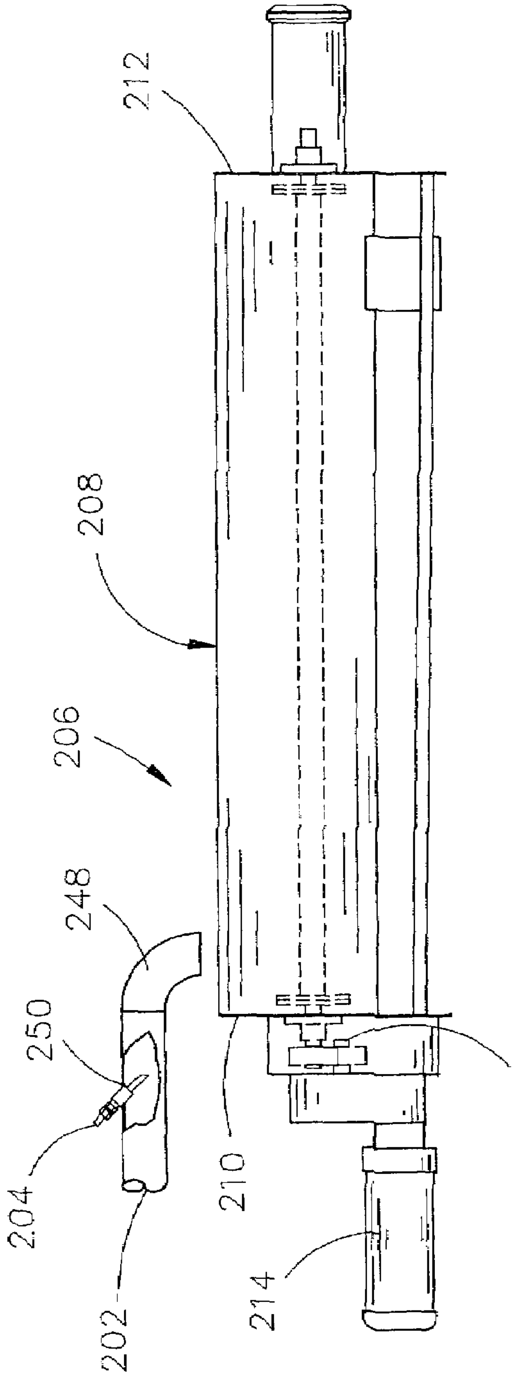
FIG. 8 is a side elevational view of the mixer of FIG. 6.

A plurality of spaced-apart paddles 236 are preferably mounted on shaft 222 along the length thereof while a plurality of spaced-apart paddles 238 are preferably mounted on shaft 224 along the length thereof. Any desired number of paddles and the spacing thereof may be utilized. As seen in FIG. 6, the paddles 236 are longitudinally offset with respect to paddles 238 to prevent interference therebetween while providing enhanced mixing action. It is preferred that the paddles 236 on shaft 222 be left-handed while the paddles 238 on shaft 224 be right-handed. The paddles may be interchanged between shafts left-hand for right-hand to create intermittent reverse flow and obtain optimum mixing. Each of the paddles 236 comprises a square hub 240 which receives shaft 222 and a paddle arm 242 extending transversely therefrom. Each of the paddles 238 comprises a square hub 244 which receives shaft 224 and a paddle arm 246 extending transversely therefrom.

The sludge is introduced into one end of body 208 by means of a feed pipe 248 provided on line 204. An acid injector 250 extends into the feed pipe 248 and is in communication with a source of acid. As the sludge and acid passes through the reactor 208 in a non-pressurized state, the mixing paddles 236 and 238 thoroughly mix the acid and sludge. The intermittent reverse flow described above ensures optimum mixing. The fact that the reactor 206 is not pressurized eliminates the problem of leaking bearings or the like. Further, the fact that the body 208 has an open top covered with a removable cover or splash shield enables the operator to view the mixing action within the body.

As seen in FIG. 5, the acidized sludge flows from reactor 206 to the pump 232 which then pumps the acidized sludge to the second reactor 242 wherein ammonia is metered thereinto by a suitable metering device. The treated sludge is delivered to a pugmill 254 and then to a rotary dryer for drying. After drying, the product is handled as described hereinbefore.

Thus it can be seen that the invention accomplishes at least all of its stated objectives.

We claim:

1. A process for treating organic waste sludge comprising the steps of:

mechanically dewatering the sludge so that the sludge is comprised of a predetermined percentage of dry solids;

passing the dewatered sludge through a first non-pressurized acid reactor;

mixing the dewatered sludge, as it passes through said first acid reactor by means of at least two rotatable shafts therein which are rotated in the same direction and which have right hand and left hand mixing paddles mounted thereon respectively for rotation therewith, with an acid to substantially lower the pH thereof;

passing the acidized sludge through a second reactor;

subjecting the acidized sludge, as it passes through said second reactor, to a basic treatment to substantially raise the pH thereof;

passing the treated sludge through a dryer;

and collecting the dried product.

2. The process of claim 1 wherein the acid and sludge are mixed in the acid reactor in a reverse flow manner.

3. The process of claim 2 wherein the reverse flow is intermittent.

4. The process of claim 1 wherein the sludge is dewatered so that the solid content thereof is approximately 18%–22%.

5. The process of claim 1 wherein the sludge is dewatered so that the solid content thereof is approximately 20%.

6. The process of claim 1 wherein the sludge is dewatered by a belt press apparatus so that the solid content thereof is approximately 18%–22%.

7. The process of claim 1 wherein the sludge is dewatered by a belt press apparatus so that the solid content thereof is approximately 20%.

8. The process of claim 1 wherein the pH of said dewatered sludge is lowered to approximately 0.5 to 1.5 in said first acid reactor.

9. The process of claim 1 wherein the pH of said dewatered sludge is lowered to approximately 1.0 in said first acid reactor.

10. The process of claim 1 wherein the pH of said dewatered sludge is raised to approximately 4.3 to 5.5 in said second reactor.

11. The process of claim 1 wherein the pH of said dewatered sludge is raised to approximately 4.5 in said second reactor.

12. The process of claim 1 wherein the pH of said dewatered sludge is lowered to approximately 0.5 to 1.5 in said first acid reactor and is raised to approximately 4.3 to 5.5 in said second reactor.

13. The process of claim 1 wherein the pH of said dewatered sludge is lowered to approximately 1.0 in said first acid reactor and is raised to approximately 4.5 in said second reactor.

14. The process of claim 1 wherein the temperature of said dewatered sludge is raised to approximately 85–95° C. in said second reactor.

15. The process of claim 1 wherein said dewatered sludge is supplied to said first acid reactor in a non-pressurized manner.

16. A process for treating organic waste sludge which does not require digestion by bacteria, comprising the steps of:

dewatering the sludge;

providing an acid reactor including an elongated mixing body having opposite ends and having at least two rotatable shafts therein which are rotatable in the same direction and which have right hand and left hand mixing paddles mounted thereon respectively for rotation therewith;

introducing the dewatered sludge into said mixing body of said acid reactor adjacent one end thereof;

introducing acid into said mixing body of said acid reactor adjacent one end thereof;

rotating said shafts to cause said paddles to mix the acid with the dewatered sludge to lower the pH thereof wherein substantially all the bacteria therein is destroyed;

discharging the acidized sludge from the other end of said mixing body of said acid reactor;

passing the acidized sludge through a second reactor;

subjecting the dewatered and acidized sludge, as it passes through said second reactor, to a basic treatment to substantially raise the pH thereof;

passing the treated dewatered sludge through a dryer;

and collecting the dried product.

* * * * *